Jan. 2, 1951 J. MERHAUT 2,536,651

PARALLEL ASSEMBLY OF AMPLIFIERS

Filed July 15, 1947 2 Sheets-Sheet 1

INVENTOR

Josef Merhaut

BY

ATTORNEY

PARALLEL ASSEMBLY OF AMPLIFIERS

Filed July 15, 1947 2 Sheets-Sheet 2

INVENTOR

Josef Merhaut

BY

ATTORNEY

Patented Jan. 2, 1951

2,536,651

UNITED STATES PATENT OFFICE 2,536,651

PARALLEL ASSEMBLY OF AMPLIFIERS

Josef Merhaut, Prague, Czechoslovakia, assignor to Tesla, slaboproudé a radiotechnické závody, Národní Podnik, Prague, Czechoslovakia Application July 15, 1947, Serial No. 761,090
In Czechoslovakia August 15, 1946

8 Claims. (Cl. 179—171)

This invention relates to amplifying systems and, more particularly, to such systems employing multiple amplifiers. A public address system such as employed by factories, municipalities, railway stations, etc. requires large output powers which may be supplied either by one large output amplifier or else by several smaller units in parallel connection.

From the point of view of rationalisation of production it is convenient to use the second alternative, which makes it possible to employ mass production methods for the manufacture of large quantities of radio valves and amplifiers of a uniform type. The working and maintenance of smaller parallel units is also more advantageous, because the arrangement continues to work even if some of the last stages become defective. It is also necessary to keep a few spare amplifier units to replace defective ones, and the assembly may be enlarged by the addition of more units.

The parallel combination of power amplifiers has only one disadvantage, namely that when amplification in one of the units decreases, the other amplifiers take over its output and become overloaded. It is, therefore, necessary to test the arrangement, from time to time, and, by means of potentiometers, to adjust amplification in such a way, that the power will be evenly distributed over all the amplifiers.

In accordance with the present invention, the foregoing disadvantage is eliminated and the load is equalized among the amplifiers in a novel manner. The inputs of all the amplifiers are connected in parallel to a common source of input potential, and the outputs of all the amplifiers are connected in parallel to a common load. The individual output currents or voltages of the several amplifiers, or voltages proportional to the individual outputs, are balanced against each other, and any resulting voltage differential is applied as a corrective feedback to the input circuits of the individual amplifiers.

When all of the output voltages or currents are equal, as when the common load is shared equally by all of the amplifiers, there will be a perfect balancing of the derived individual voltages and thus no resulting feedback due to a voltage differential. However, should one amplifier have more than its share of the load, the resulting differential voltage, due to the unbalancing of the system, applies a corrective feedback to the input of such one amplifier in such a manner that its share of the load is correctively decreased.

In one embodiment of the invention, the output voltage of each amplifier is compared to a voltage corresponding to its pro-rated proportion of the common load. This is effected by measuring the drop across an impedance in the common load circuit and comparing this drop with those across individual and equal impedances in the individual amplifier outputs. The value of the load impedance is equal to the value of the individual output impedances divided by the number of amplifiers. Consequently, the voltage drop across the load impedance, with all the amplifiers feeding equally to the load, is equal to the voltage drop across each individual output impedance.

In another embodiment, each individual amplifier output includes an equally divided two-section transformer primary winding, the two sections being in phase opposition and the several windings of all the amplifiers being equal. Corresponding primary winding section of each amplifier is connected to a common line so that, upon a load unbalance, the unbalanced amplifier will have a circulating current in its primary winding section resulting in a net voltage being applied to its secondary transformer winding. This net voltage is applied as a corrective feedback to the amplifier input. In both embodiments of the invention, the corrective feedback voltage may be rectified if necessary or desirable.

With the foregoing in mind, an object of this invention is to provide an improved multiple amplifier arrangement connected between a common signal input and a common load.

Another object is to provide such an arrangement in which equalization of the load between the individual amplifiers is effected automatically.

These, and other objects, advantages and novel features of the invention will be apparent from the following description and the accompanying drawings.

Figure 1:
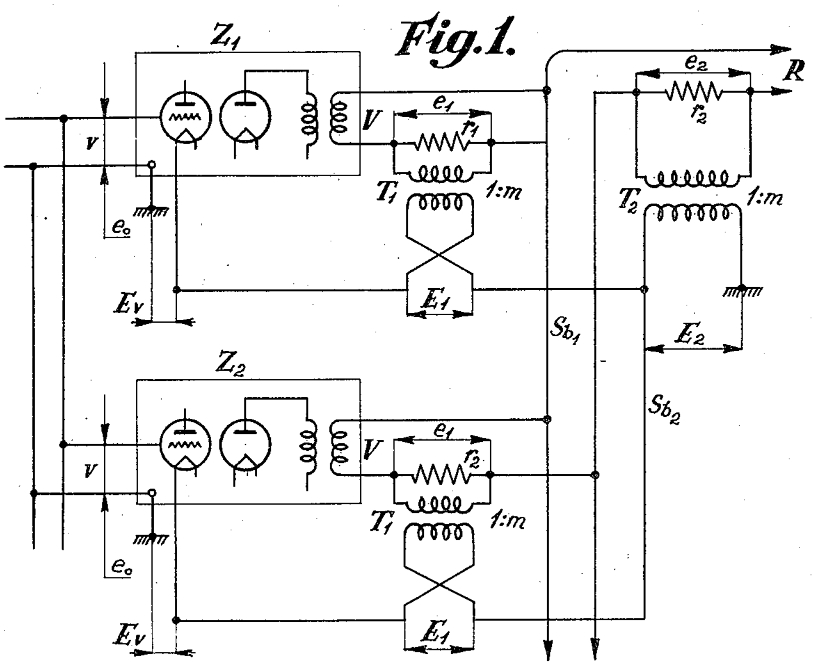
Fig. 1 is a schematic wiring diagram of a multiple amplifier arrangement embodying the invention.

Referring to Fig. 1, amplifier units $Z_1$, $Z_2$—$Z_n$, have their inputs connected to a common input line so that the individual input signal voltages $v$ are equal to the voltage $e_o$ from a common preamplifier. The outputs V of the amplifiers are applied to common load lines $Sb_1$, $Sb_2$, leading to loudspeaker R. Impedances $r_1$ are connected to each individual output line of the amplifier, and impedance $r_2$ to the common load line, the impedance being dimensioned so that $$r_2=\frac{r_1}{n}$$

where $n$ equals the number of parallel output amplifiers. Since the audio frequency current flowing from $n$-amplifiers through the common impedance $r_2$ is $n$-times larger than the currents flowing through impedances $r_1$, but impedance $r_1$ is $n$-times larger than impedance $r_2$, the voltage drops $e_1$ across impedances $r_1$ will be identical with the voltage drops $e_2$ across impedance $r_2$ as long as each of the amplifiers supplies its proper share of the whole load. If transformers $T_1$ and $T_2$ of the same transformer ratio, e. g. 1:$m$ are shunted across impedance $r_1$ and $r_2$, respectively, their secondary voltages will also be the same. This induced voltage is correctively fed back to the amplifier input to reduce their resultant voltage $E_v=E_2-E_1=0$.

If one of the amplifiers supplies an output current differing from that supplied by the other ones, secondary voltage $E_1$ of transformer $T_1$ will correspondingly differ from secondary voltage $E_2$ of transformer $T_2$, and if the secondary windings of transformers $T_1$ and $T_2$ are fed in the correct phase, the resultant voltage $E_v$ will correctively combine with input voltage $e_o$ so, that the output of the amplifier in question will be correctively changed. The resultant voltage $E_v$, therefore, acts as a corrective feed-back.

Figure 2:
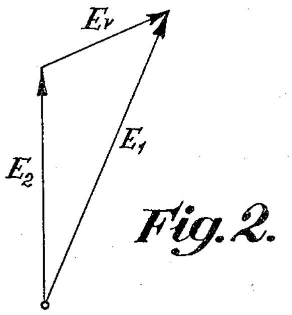
Fig. 2 is a vector diagram illustrating the voltage relations.

Fig. 2 shows vectorially that even when there is a phase difference between voltages $E_1$ and $E_2$ there is still a resultant corrective voltage $E_v$ which, being fed correctively into the amplifier input, tends to remove the amplitude and phase difference between the two voltages $E_1$ and $E_2$.

Figure 3:
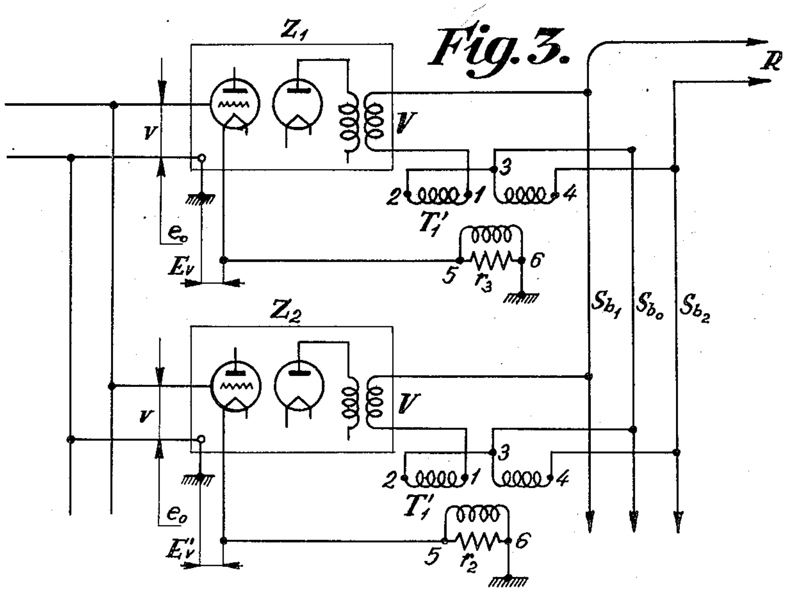
Fig. 3 is a schematic wiring diagram of another embodiment of the invention.

The functioning of the other embodiment of the invention will now be explained with reference to Fig. 3. All the individual amplifiers supply current into a common line $Sb_o$ through the primary windings 1—2 of transformers $T'_1$. This current divides in the ratio of the conductivity of windings 3—4, and then unites again in the common load line $Sb_2$ leading to loudspeaker R. If all amplifiers are evenly loaded the currents flowing through windings 1—2 and 3—4 are also equal, and since the number of turns of both windings is also equal and the windings are connected in phase opposition, there will be no induced voltage $E'_v$ in secondary windings 5—6. If, however, some one of the component amplifiers supplies into line $Sb_o$, through windings 1—2, a larger current than should be its relative share, the magnetising effect of its windings 1—2 will be larger than that of its windings 3—4, and a voltage $E'_v$ will be induced in the secondary windings 5—6. This induced voltage is correctively fed back to the amplifier input to reduce the larger output of this amplifier to equalize the load division. Resistors $r_3$ in the secondary windings 5—6 provide an ohmic transformer load so that the corrective voltage $E'_v$ is in phase with the amplifier current.

The advantages of this arrangement against the one shown in Figure 1 are:

Transformer $T_2$ is eliminated and, consequently, production of this assembly is simpler. Furthermore, it is possible permanently to build in arrangements for parallel connection of amplifiers into the component units. There is no need here for any additional arrangements, there is also no need to carry out any changes or alterations in the arrangements should the equipment be increased, no matter how many units there are connected in parallel.

Figure 4:
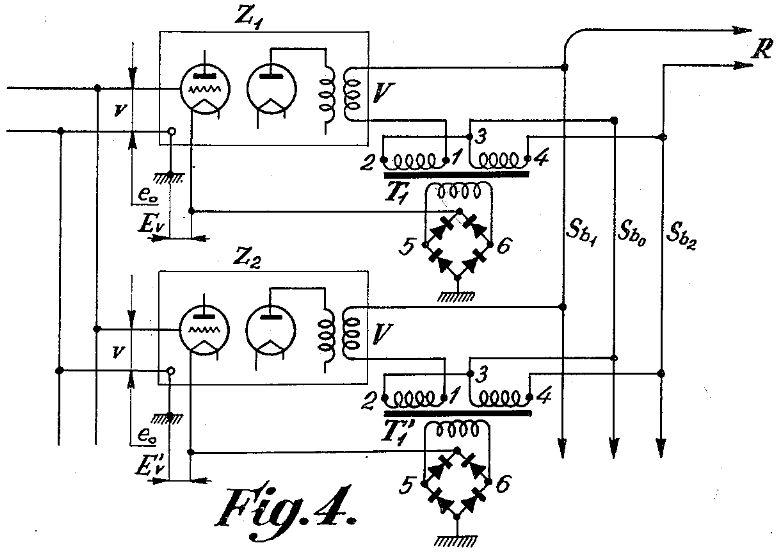
Fig. 4 illustrates feedback voltage rectification incorporated in the embodiment of Fig. 3.

Fig. 4 illustrates full wave rectifiers connected between secondary windings 5—6 and the input feedback conductors, so that the rectified feedback voltage may be applied as a bias voltage to the input. Of course, such rectifiers can be applied in a corresponding manner to the amplifier feedback circuits of the arrangement of Fig 1.

While specific embodiments of the invention have been shown and described in detail to illustrate the application of the invention principles, it should be understood that the invention may be otherwise embodied without departing from such principles.

I claim:

1. A multiple amplifier assembly comprising, in combination, a plurality of individual amplifiers having their inputs connected, in parallel circuit relation, to a single common source of signals and their outputs connected, in parallel circuit relation, to a single common load; individual current measuring means each connected in the output of a respective amplifier, the current flows through each measuring means being equal, and all the output currents being balanced, when each amplifier is supplying its proper share of the load; and means operative, responsive to a variation in the current measured by any one of said measuring means upon its associated amplifier supplying a disproportionate share of the load, to apply a corrective feedback potential to the input of its associated amplifier to restore the load share thereof to its proper value.

2. An assembly as claimed in claim 1 in which said current measuring means comprises individual series impedances each connected in a separate amplifier output, a common series impedance connected in series between all of the outputs and the common load, and circuit means operative to balance the voltage drop across said common impedance against the voltage drop across each individual impedance.

3. An assembly as claimed in claim 1 in which said current measuring means each includes a pair of transformer primary windings connected in phase opposition, one winding of each pair measuring the individual amplifier output current and the other winding of each pair measuring such proper share of the load current.

4. A multiple amplifier assembly comprising, in combination, a plurality of individual amplifiers having their inputs connected, in parallel circuit relation, to a single common source of signals and their outputs connected, in parallel circuit relation, to a single common load; a plurality of equal value individual impedances, each connected in series in the output of a different amplifier; a common impedance connected in series in the common load circuit, the value of said common impedance being equal to that of any individual impedance divided by $n$, where $n$ equals the number of parallel connected individual amplifiers; whereby, when the load is shared equally by said amplifiers, the voltage drop across each individual impedance will equal that across said common impedance; and means operative, responsive to a differential of said voltage drops when an amplifier supplies a disproportionate share of the common load, to apply a corrective feedback potential to the input of such amplifier to equalize its share of the load with the shares of the other amplifiers.

5. An assembly as claimed in claim 4 in which the feedback means includes rectifying means.

6. A multiple amplifier assembly comprising, in combination, a plurality of individual amplifiers having their inputs connected, in parallel circuit relation, to a single common source of signals and their outputs connected, in parallel circuit relation, to a single common load; an individual pair of transformer primary windings operatively associated with the output circuit of each amplifier, the windings of each pair being equal and connected in phase opposition; one winding of each pair being connected in series with the output circuit of its associated amplifier, the other windings of each pair carrying an equal proportionate share of the total load; and an individual secondary winding coupled to each pair of primary windings and each operative, when its associated amplifier carries a disproportionate share of the load, to apply the resultant secondary voltage as a corrective feedback potential to the input of its associated amplifier.

7. An assembly as claimed in claim 6 in which the feedback means includes rectifying means.

8. An assembly as claimed in claim 4 in which the feedback means includes individual transformers each connected across an impedance, and the voltage drop across the common impedance is applied in opposition to the voltage drop across each individual impedance.

JOSEF MERHAUT.

REFERENCES CITED

The following references are of record in the file of this patent:

UNITED STATES PATENTS

| Number | Name | Date |
|---|---|---|
| 380,942 | Shallenberger | Apr. 10, 1888 |
| 2,414,242 | Potter | Jan. 14, 1947 |